US008106743B2

(12) United States Patent
Katsuyama

(10) Patent No.: US 8,106,743 B2
(45) Date of Patent: Jan. 31, 2012

(54) ELECTRONIC APPARATUS, REMOTE CONTROLLER AND REMOTE CONTROL SYSTEM

(75) Inventor: Akira Katsuyama, Kanagawa (JP)

(73) Assignee: Sony Corporation (JP)

( * ) Notice: Subject to any disclaimer, the term of this patent is extended or adjusted under 35 U.S.C. 154(b) by 973 days.

(21) Appl. No.: 12/080,323

(22) Filed: Apr. 2, 2008

(65) Prior Publication Data

US 2008/0252478 A1 Oct. 16, 2008

(30) Foreign Application Priority Data

Apr. 10, 2007 (JP) ............................... P2007-103159

(51) Int. Cl.
*G05B 19/02* (2006.01)

(52) U.S. Cl. ...................... 340/4.3; 340/10.3; 340/12.22

(58) Field of Classification Search ................. 340/4.11, 340/4.3, 4.31, 12.22, 12.24, 12.27, 12.28, 340/10.1, 10.3, 10.33, 10.34; 455/90.1, 574, 455/575.9, 345
See application file for complete search history.

(56) References Cited

U.S. PATENT DOCUMENTS

| | | | | |
|---|---|---|---|---|
| 5,625,338 | A * | 4/1997 | Pildner et al. | 340/539.3 |
| 6,236,850 | B1 * | 5/2001 | Desai | 455/343.2 |
| 2005/0253682 | A1 | 11/2005 | Kato et al. | |

FOREIGN PATENT DOCUMENTS

| | | | |
|---|---|---|---|
| JP | 11-206040 | A | 7/1999 |
| JP | 11-285086 | A | 10/1999 |
| JP | 2000-028191 | A | 1/2000 |
| JP | 2002-135856 | A | 5/2002 |
| JP | 2005-076375 | A | 3/2005 |
| JP | 2005-328296 | A | 11/2005 |

* cited by examiner

*Primary Examiner* — Nabil Syed

(74) *Attorney, Agent, or Firm* — Lerner, David, Littenberg, Krumholz & Mentlik, LLP

(57) ABSTRACT

An electronic apparatus is remotely controlled based on a remote control signal transmitted from a remote controller using radio wave. The electronic apparatus contains a communication module that receives the remote control signal transmitted from the remote controller and an electronic apparatus main body that performs predetermined processing based on the remote control signal from the remote controller. The remote control signal is received by the communication module. The communication module has an intermittent operation mode in which the communication module operates intermittently when the electronic apparatus main body shifts to a standby state thereof. The period of off time of the communication module in the intermittent operation mode thereof is shorter than a period of transmission time of the remote controller for transmitting a power-on signal that causes the electronic apparatus main body to shift the standby state thereof to a normal state thereof.

4 Claims, 4 Drawing Sheets

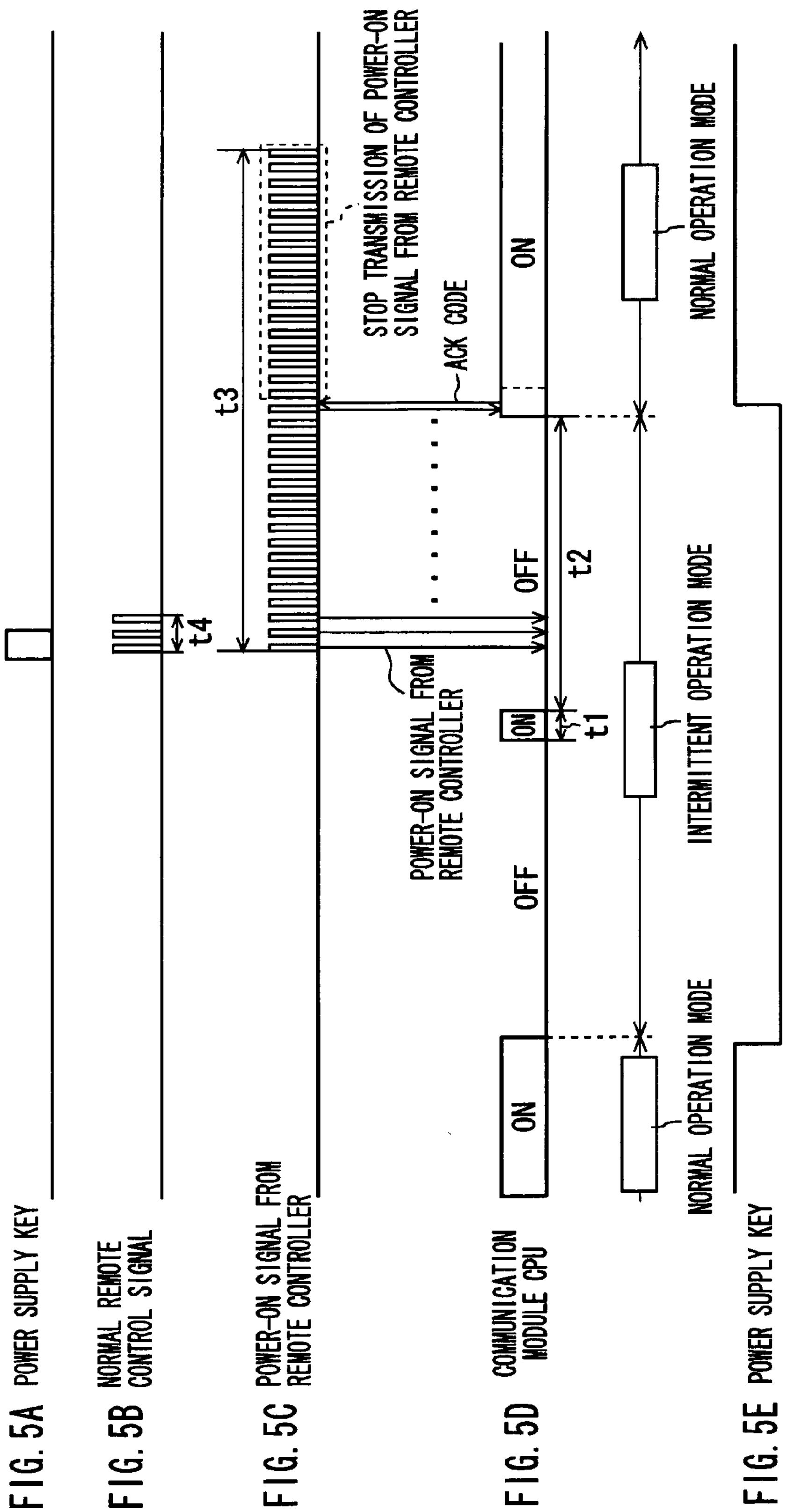
FIG. 5A POWER SUPPLY KEY
FIG. 5B NORMAL REMOTE CONTROL SIGNAL
FIG. 5C POWER-ON SIGNAL FROM REMOTE CONTROLLER
FIG. 5D COMMUNICATION MODULE CPU
FIG. 5E POWER SUPPLY KEY

ELECTRONIC APPARATUS, REMOTE CONTROLLER AND REMOTE CONTROL SYSTEM

CROSS-REFERENCE TO RELATED APPLICATIONS

The present application claims priority from Japanese Patent Application No. JP 2007-103159 filed in the Japanese Patent Office on Apr. 10, 2007, the entire content of which is incorporated herein by reference.

BACKGROUND OF THE INVENTION

1. Field of the Invention

This invention relates to an electronic apparatus, a remote controller that controls the remote controller remotely, and a remote control system using the remote controller and the electronic apparatus.

2. Description of Related Art

Recently, the remote controller using radio waves has widely proposed and utilized in order to be made hard to receive any influence by an obstacle. Since a transmission and reception module of a receiving apparatus (an electronic apparatus) to be remotely controlled may operate continuously at radio frequencies in a case where the remote controller using radio waves is used, the electronic apparatus has higher power consumption at its standby state as compared with the electronic apparatus if a remote controller using infrared rays is used.

Japanese Patent No. 3392751 has disclosed a method of reducing the power consumption at the standby state of the electronic apparatus at a receiving side. For example, an electronic apparatus to be remotely controlled by a remote controller using infrared rays drives its light-receiving element intermittently. In this intermittent operation time of the light-receiving element, a period of transmission time of the remote control signal is set so that it becomes longer than a period of stop (off) time within the intermittent operation of the light-receiving element, in order for the light-receiving element to receive the remote control signal surely from the remote controller.

SUMMARY OF THE INVENTION

In the method disclosed in Japanese Patent No. 3392751, however, the intermittent operation of the light-receiving element is not controlled according to which is normal operation or standby operation the electronic apparatus performs. The light-receiving element may operate intermittently during the normal operation of the electronic apparatus so that it is difficult for the electronic apparatus to receive any signals from the remote controller rapidly and efficiently.

Further, a period of transmission time of the remote control signal is set so that it becomes longer than a period of stop (off) time within the intermittent operation of the light-receiving element, but even after the light-receiving element of the electronic apparatus has started its normal operation, the remote controller continues to transmit the signal within a remaining period of time for signal transmission. Thus, the remote controller transmits any excessive signals to the electronic apparatus, thereby causing power to be idly consumed in the remote controller.

It is desirable to present an electronic apparatus, a remote controller, and a remote control system in which the electronic apparatus and the remote controller, which are communicated to each other using radio waves, may operate accurately in their standby states and reduce their power consumptions in their standby states.

According to an embodiment of the present invention, there is provided an electronic apparatus that is remotely controlled based on a remote control signal transmitted from a remote controller using radio wave. The electronic apparatus contains a communication module that receives the remote control signal transmitted from the remote controller and an electronic apparatus main body that performs predetermined processing based on the remote control signal from the remote controller. The remote control signal is received by the communication module. The communication module has an intermittent operation mode in which the communication module operates intermittently when the electronic apparatus main body shifts to a standby state thereof. A period of off time of the communication module in the intermittent operation mode thereof is shorter than a period of transmission time of the remote controller for transmitting a power-on signal that causes the electronic apparatus main body to shift the standby state thereof to a normal state thereof.

In this embodiment, when the electronic apparatus main body of the electronic apparatus shifts to its standby state, the communication module detects the power supply information of the electronic apparatus main body and shifts to its intermittent operation mode. If the electronic apparatus main body shifts from its standby state to its normal state, the remote controller transmits the power-on signal to the electronic apparatus. When a user pushes down, for example, a power key provided on the remote controller, the remote controller transmits the remote control signal or the power-on signal to the electronic apparatus. The period of off time of the communication module in the intermittent operation mode thereof is shorter than a period of transmission time of the remote controller for transmitting a power-on signal that causes the electronic apparatus main body to shift the standby state thereof to a normal state thereof. Namely, the period of transmission time of the power-on signal is set in the remote controller so as to be longer than the period of OFF time of the communication module of the electronic apparatus in the intermittent operation thereof. This enables the communication module of the electronic apparatus to receive the power-on signal from the remote controller surely within a period of ON time thereof.

By the embodiment of the electronic apparatus according to the invention, the communication module of the electronic apparatus operates intermittently in the standby state of the electronic apparatus main body, thereby enabling an average power consumption of the electronic apparatus to be reduced.

Alternatively, the communication module of the electronic apparatus transmits a response signal to the remote controller when receiving the power-on signal from the remote controller.

According to another embodiment of the present invention, there is provided a remote controller that controls an electronic apparatus using radio wave. The remote controller contains an operation unit that has a changeover key for shifting the electronic apparatus from the standby state thereof to the normal state thereof and a communication module that transmits to the electronic apparatus a power-on signal for shifting the electronic apparatus to the normal state thereof based on operation to the changeover key. A period of transmission time of the remote controller for transmitting the power-on signal is longer than a period of off time of a communication module of the electronic apparatus in the intermittent operation thereof. The communication module stops transmission of the power-on signal when receiving the response signal from the electronic apparatus in response to the power-on signal transmitted from the remote controller to the electronic apparatus even in the period of the transmission time of the power-on signal.

In this embodiment, if the electronic apparatus main body shifts from its standby state to its normal state, the remote controller transmits the power-on signal to the electronic apparatus. The period of transmission time of the power-on signal is set in the remote controller so as to be longer than the period of off time of the communication module of the electronic apparatus in the intermittent operation thereof. This enables the communication module of the electronic apparatus to receive the power-on signal from the remote controller surely within a period of ON time. The electronic apparatus also transmits an acknowledged (ACK) signal as a response signal to the remote controller when the electronic apparatus receives the power-on signal from the remote controller. The remote controller stops the transmission (generation) of this power-on signal even in the period of the transmission time of the power-on signal.

In the embodiment of the remote controller according to the invention, the transmission of the power-on signal stops when the remote controller receives the response signal from the electronic apparatus, thereby restraining wasteful power from being consumed in the remote controller.

According to further embodiment of the present invention, there is provided a remote control system containing a remote controller and an electronic apparatus that is remotely controlled by the remote controller based on a remote control signal transmitted from the remote controller using radio wave. The electronic apparatus includes a first communication module that receives the remote control signal transmitted from the remote controller and an electronic apparatus main body that performs predetermined processing based on the remote control signal from the remote controller. The remote control signal is received by the first communication module. The remote controller includes an operation unit that has a changeover key for shifting the electronic apparatus main body from the standby state thereof to the normal state thereof and a second communication module that transmits to the electronic apparatus a power-on signal for shifting the electronic apparatus main body to the normal state thereof based on operation to the changeover key. A period of off time of the first communication module of the electronic apparatus in the intermittent operation thereof is shorter than a period of transmission time of the remote controller for transmitting a power-on signal that causes the electronic apparatus main body to shift the standby state thereof to a normal state thereof. The first communication module of the electronic apparatus shifts from the intermittent operation mode thereof to the normal operation mode based on the power-on signal received from the remote controller.

In this embodiment, when the electronic apparatus main body of the electronic apparatus shifts to its standby state, the communication module detects the power supply information of the electronic apparatus main body and shifts to its intermittent operation mode. If the electronic apparatus main body shifts from its standby state to its normal state, the remote controller transmits the power-on signal to the electronic apparatus. The period of transmission time of the power-on signal is set in the remote controller so as to be longer than the period of off time of the communication module of the electronic apparatus in the intermittent operation thereof. This enables the communication module of the electronic apparatus to receive the power-on signal from the remote controller surely within a period of ON time. The electronic apparatus also transmits an acknowledged (ACK) signal as a response signal to the remote controller when the electronic apparatus receives the power-on signal from the remote controller. The remote controller stops the transmission (generation) of this power-on signal even in the period of the transmission time therefor.

By the embodiment of the remote control system according to the invention, it is possible to reduce an average power consumption of the electronic apparatus and restrain wasteful power from being consumed in the remote controller.

It is to be noted that a state where components in the electronic apparatus turn on electricity and may normally operate is referred to as "the normal state of the electronic apparatus" in this description.

It is to be noted that if the electronic apparatus is reproduction and record apparatus such as a digital versatile disc (DVD)/video recorder, a state where a power key provided on the electronic apparatus or a power key provided on the remote controller is pushed down so that the electronic apparatus turns off is referred to as "the standby state of the electronic apparatus" in this description. Alternatively, it is to be noted that if the electronic apparatus is display apparatus such as a television, a state where a main power supply of the electronic apparatus turns on and a power key provided on the remote controller turns off is referred to as "the standby state of the electronic apparatus" in this description.

It is also to be noted that the radio wave includes electromagnetic waves with frequencies from a very-low-frequency radio wave to far-infrared through extremely high frequency (EHF) and a submillimeter wave.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 5A through 5E are timing chart for showing the operations of the remote control system.

DESCRIPTION OF THE PREFERRED EMBODIMENTS

The following will describe embodiments of the present invention with reference to the drawings.

(Remote Control System)

Figure 1:
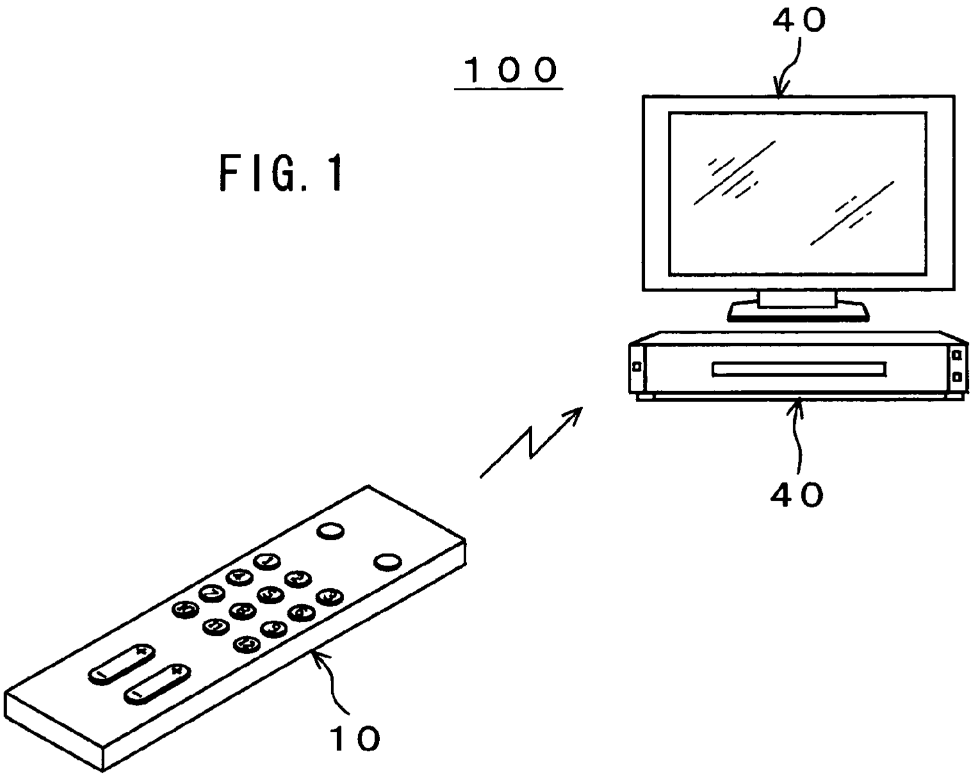
FIG. 1 is a diagram for showing a configuration of an embodiment of a remote control system according to the present invention.

FIG. 1 shows a configuration of an embodiment of a remote control system 100 according to the present invention.

The remote control system 100 contains an electronic apparatus 40 such as a television and a DVD/video recorder and a remote controller 10 which operates the electronic apparatus 40 remotely. The remote controller 10 transmits a remote control signal to the electronic apparatus 40 using radio waves. The electronic apparatus 40 executes predetermined processing based on the remote control signal received from the remote controller 10. With respect to the radio waves, for example, a frequency of 900 MHz-band, 2.4 GHz-band or the like is used.

(Configuration of Remote Controller)

Figure 2:
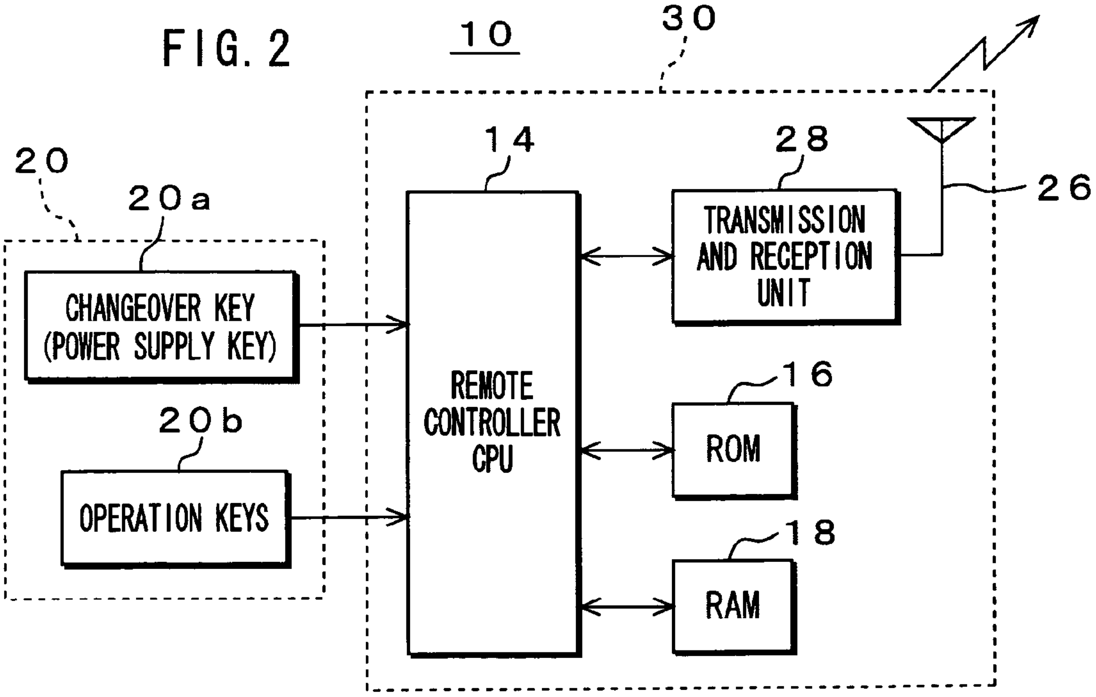
FIG. 2 is a block diagram for showing a configuration of an embodiment of a remote controller according to the present invention.

The following will describe a configuration of the remote controller 10. FIG. 2 shows a configuration of the remote controller 10. The remote controller 10 includes a communication module 30 and an operation unit 20. The communication module 30 contains a remote controller central processing unit (CPU) 14, a read only memory (ROM) 16, a random access memory (RAM) 18, a transmission and reception unit 28, and an RF antenna 26.

The remote controller CPU 14 controls the whole remote controller 10, reads a basic program and various kinds of programs out of the ROM 16, and develops them to the RAM 18, thereby executing various kinds of processing. Also, the ROM 16 stores format information assigned to every maker, model information assigned to every category (electronic apparatus 40), function information (code signal) assigned to every control function (operation content) and the like.

The operation unit 20 contains a power supply key 20*a* for performing the turning ON/OFF of the power supply of the electronic apparatus 40 and a plurality of operation keys 20*b* such as channel keys for selecting the channels and a sound volume key for performing the adjustment of sound volume. In this embodiment, the power supply key 20*a* is used as a changeover (relation) key which allows a communication module CPU 80 of the electronic apparatus 40 (see FIG. 3) to shift from an intermittent operation mode thereof to a normal operation mode thereof (allows an electronic apparatus main body 82 (see FIG. 3) to shift from a standby state thereof to a normal state thereof). The power supply key 20*a* as the changeover key can transmit the remote control signal continuously in a certain period of time even if it is a normal short period of pushed-down time. When a user pushes the power supply key 20*a* down, the remote controller CPU 14 detects an output signal in response to the power supply key 20*a*, reads a power-on signal out of the ROM 16, and supplies it to the transmission and reception unit 28. The operation keys 20*b* in addition to the power supply key 20*a* may transmit the remote control signal normally only in a certain period of pushed-down time and may cancel the pushed-down operation when the electronic apparatus main body 82 is in the standby state so as not to transmit the remote control signal. In addition, function of the changeover key may be assigned to any one of the operation keys 20*b* or each of the plurality of operation keys 20*b*. For example, function of the changeover key may be assigned to any channel keys as the operation keys 20*b*. In this case, after the electronic apparatus main body 82 is returned to the normal state thereof by pushing the channel key down, the electronic apparatus displays a program relative to the channel thus pushed down.

The transmission and reception unit 28 performs amplification and modulation processing on a predetermined remote control code received from the remote controller CPU 14 and supplies it to the RF antenna 26. The RF antenna 26 transmits the remote control signal to the electronic apparatus 40 using radio waves based on the received remote control code.

(Configuration of Electronic Apparatus)

Figure 3:
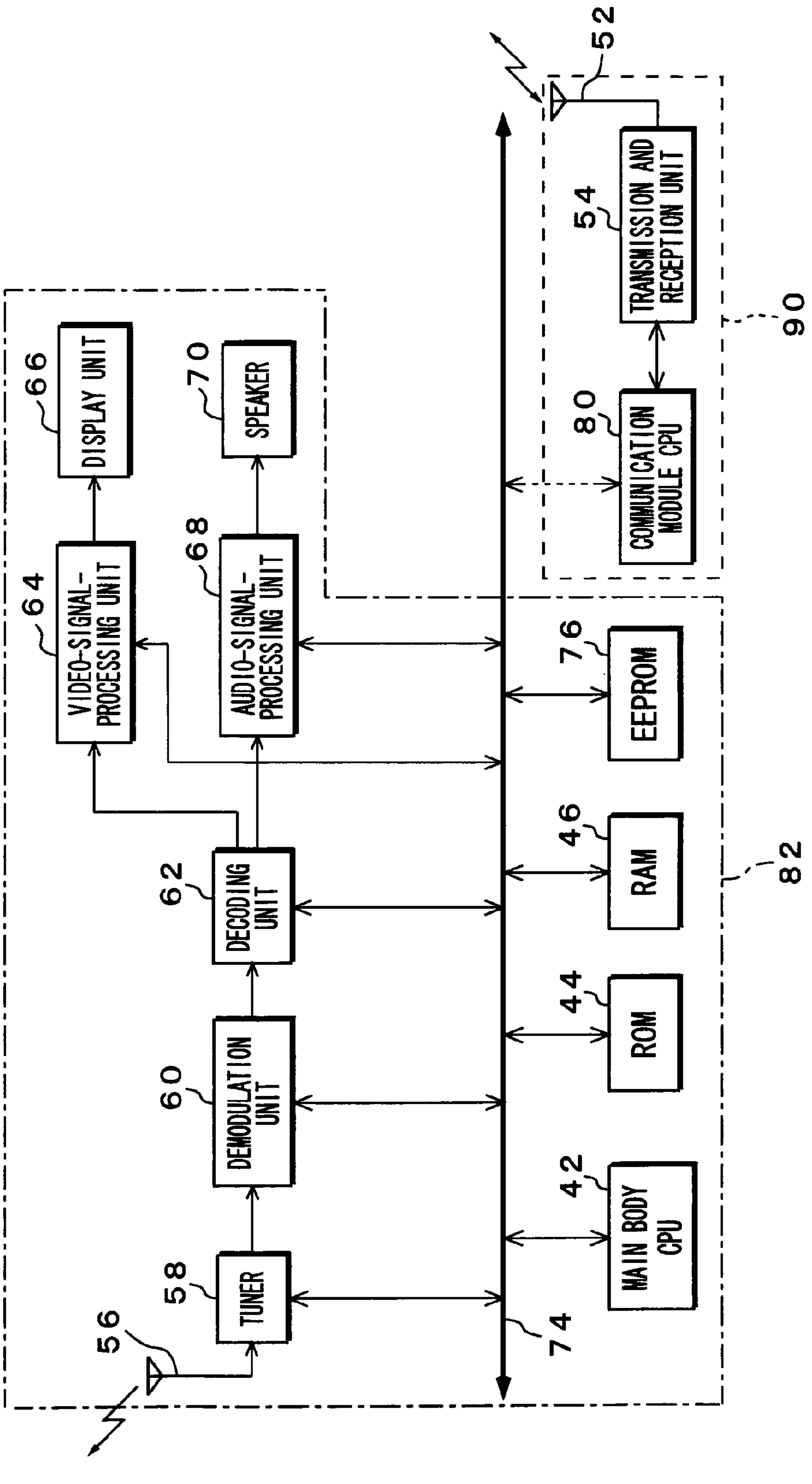
FIG. 3 is a block diagram for showing a configuration of an embodiment of an electronic apparatus according to the present invention.

The following will describe a configuration of an embodiment of an electronic apparatus 40 according to the invention. FIG. 3 shows a configuration of the electronic apparatus 40.

As shown in FIG. 3, the electronic apparatus 40 includes an electronic apparatus main body 82 which functions as a display device such as a television. The electronic apparatus main body 82 contains a main body CPU 42, a ROM 44, a RAM 46, an electrically erasable programmable read only memory (EEPROM) 76, a broadcast-signal-receiving antenna 56, a tuner 58, a demodulation unit 60, a decoding unit 62, a video-signal-processing unit 64, a display unit 66, an audio-signal-processing unit 68, and a speaker 70.

The main body CPU 42 controls the whole electronic apparatus main body 82, reads basic programs and various kinds of application programs out of the ROM 44 through a bus 74, and develops them to the RAM 46 and the EEPROM 76, thereby enabling the electronic apparatus main body 82 to execute various kinds of processing.

The broadcast-signal-receiving antenna 56 receives the broadcast signal and supplies the received broadcast signal to the tuner 58. The tuner 58 tunes the broadcast signals to a desired channel based on the instructions from the main body CPU 42 and supplies the tuned broadcast signal to the demodulation unit 60.

The demodulation unit 60 demodulates the tuned broadcast signal and obtains a transport stream. Then, the demodulation unit 60 separates compressed video data and compressed audio data from the transport stream and supplies the respective compressed video data and compressed audio data to the decoding unit 62. The transport stream by the digital broadcast is constituted by multiplexing compressed data in which video signals and audio signals of a plurality of programs (broadcast programs) are compressed, for example, according to the Moving Picture Experts Group Layer 2 (MPEG2) system and various kinds of additional information.

The decoding unit 62 decodes the respective compressed video data and compressed audio data that are received from the demodulation unit 60, supplies the video data to the video-signal-processing unit 64 and the audio data to the audio-signal-processing unit 68.

The video-signal-processing unit 64 performs the vertical-horizontal synchronizing signal detection and various kinds of video signal processing on the video data received from the decoding unit 62 and outputs the processed video data to the display unit 66. The display unit 66 is constituted, for example, by a display of a cathode ray tube (CRT), a liquid crystal display (LCD), plasma display panel (PDP) or the like and displays an image based on the output signal received from the video-signal-processing unit 64.

The audio-signal-processing unit 68 performs desired audio signal processing on the digital audio data received from the decoding unit 62, converts the processed audio signal to an analog audio signal, and outputs sounds from the speaker 70.

Also, the electronic apparatus 40 includes, as shown in FIG. 3, a communication module 90. The communication module 90 contains a communication module CPU 80 which constitutes a control unit, a transmission and reception unit 54, and an RF antenna 52. The communication module CPU 80 may be connected to the bus 74.

The RF antenna 52 receives a remote control signal from the remote controller 10 using radio waves and supplies it to the transmission and reception unit 54. The transmission and reception unit 54 performs amplification and demodulation processing on the remote control signal received from the RF antenna 52 and supplies the processed signal to the communication module CPU 80. Also, the transmission and reception unit 54 performs modulation processing on the ACK code (response signal) received from the communication module CPU 80 and supplies it to the RF antenna 52. The RF antenna 52 transmits the remote control signal based on the ACK code to the remote controller 10 using radio waves.

The communication module CPU 80 converts the remote control signal that is subject to the demodulation processing or the like in the transmission and reception unit 54 to a predetermined remote control code and supplies it to the main body CPU 42. Also, the communication module CPU 80 shifted the normal operation mode thereof to the intermittent operation mode thereof or the intermittent operation mode thereof to the normal operation mode thereof based on the power supply information received from the electronic apparatus main body 82. In the intermittent operation mode, a control unit and an arithmetic unit inside the communication module CPU 80 operate intermittently based on a timer provided inside the communication module CPU 80. The timer has, for example, a counter value which is set beforehand for the intermittent operation mode and makes a pulse signal to rise up when the counter value becomes the set value. The control unit and the arithmetic unit inside the communication module CPU 80 repeatedly carries out ON/OFF operations by making this pulse signal as a trigger. In addition, the communication module CPU 80 controls the transmission and reception unit 54 so that the transmission and reception unit 54 can operate when the communication module CPU 80 is ON and the transmission and reception unit 54 can stop the operation thereof when the communication module CPU 80 is OFF. This enables the transmission and reception unit 54 to operate intermittently accompanying with a shift of the communication module CPU 80 to the intermittent operation mode thereof.

Also, the main body CPU 42 of the electronic apparatus main body 82 executes predetermined processing based on a remote control code received from the communication module CPU 80 and at the same time, supplies an operating state (normal state or standby state) of the electronic apparatus main body 82 to the communication module CPU 80 as the power supply information.

(Operations of Remote Control System)

The following will describe the operations of the remote controller 10 and the electronic apparatus 40 when the remote controller 10 controls the electronic apparatus 40 remotely using radio waves with reference to FIGS. 2 through 5E.

Figure 4:
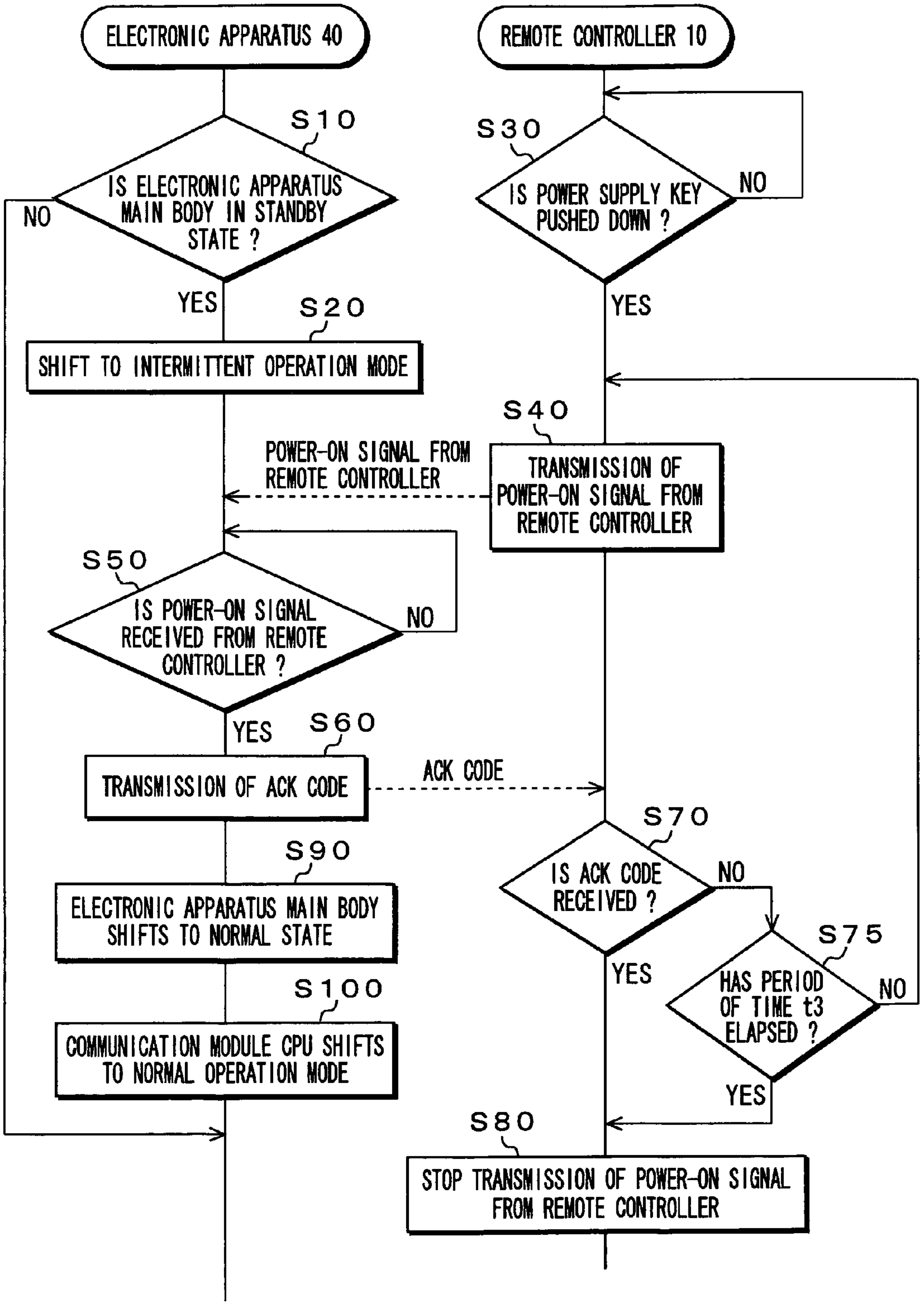
FIG. 4 is a flowchart for showing operations of the remote control system.

FIG. 4 shows the operations of the remote control system 100 when the remote controller 10 controls the electronic apparatus 40 remotely using radio waves. FIGS. 5A through 5E show a relationship between the power-on signal from the remote controller 10 and the intermittent operation mode of the electronic apparatus 40.

First, at step S10 as shown in FIG. 4, the communication module CPU 80 in the electronic apparatus 40 judges whether or not the electronic apparatus main body 82 shifts from the normal state thereof to the standby state thereof. For example, when the power supply button provided in the electronic apparatus main body 82 turns off so that the electronic apparatus main body 82 shifts to the standby state thereof or when the user pushes the power supply key 20*a* of the remote controller 10 down and the power supply of the electronic apparatus main body 82 turns off so that the electronic apparatus main body 82 shifts to the standby state thereof, a power supply signal (voltage) supplied from the electronic apparatus main body 82 to the communication module CPU 80 as the power supply information is changed from H-level to L-level (see FIG. 5E). By detecting the change of this power supply signal, the communication module CPU 80 can judge that the electronic apparatus main body 82 has shifted from the normal operation mode thereof to the standby operation mode thereof. When the electronic apparatus main body 82 shifts to the standby operation mode thereof, the operation goes to step S20.

At the step S20, the communication module CPU 80 of the electronic apparatus 40 shifts from the normal operation mode thereof to the intermittent operation mode thereof based on the detected power supply signal. In the intermittent operation mode, the communication module CPU 80 is driven intermittently and periodically by the timer or the like provided inside the electronic apparatus 40 so as to become in an ON state during a period of time t1 and to become in an OFF state during a period of time t2 (see FIG. 5D). The period t1 is set to, for example, 10 msec and the period t2 is set to, for example, 90 msec. The transmission and reception unit 54 also repeats the ON/OFF operations intermittently at a similar timing in synchronism with the intermittent operations of the communication module CPU 80.

At step S30, the remote controller 10 judges whether or not the power supply key 20*a* for allowing the communication module CPU 80 of the electronic apparatus 40 to shift from the intermittent operation mode thereof to the normal operation mode thereof is pushed down. When it is judged that the power supply key 20*a* is pushed down, the operation goes to step S40 (see FIG. 5A) while when it is judged that no power supply key 20*a* is pushed down, the operation remains in the step S30 where it becomes the standby state.

At the step S40, when the power supply key 20*a* is pushed down, the remote controller 10 transmits the power-on signal to the electronic apparatus 40. The remote controller 10 transmits the power-on signal continuously during the period of time t3. The period of time t3 during when the remote control signal is transmitted is set so as to become longer than the period of OFF time t2 of the communication module CPU 80. Also, the remote control signal is constituted by a plurality of frames and in this embodiment, it is constituted such that thirty-four frames are transmitted with an equal interval. It is to be noted that when the user pushes any one of the normal operation keys 20*b* down, not the power supply key 20*a*, the remote controller 10 transmits, for example, three frames continuously during the period of time t4 (see FIG. 5B). Thus, the power supply key 20*a* which functions as changeover key and other operation keys 20*b* are different from each other in the period of transmission time and the number of frames to be transmitted even if the period of pushed-down times are the same (see FIGS. 5A and 5B).

At step S50, the communication module CPU 80 of the electronic apparatus 40 judges whether or not the power-on signal is received from the remote controller. The electronic apparatus 40 receives no power-on signal from the remote controller because the transmission and reception unit 54 does not operate when the communication module CPU 80 is OFF (the period of time t2) (see FIGS. 5C and 5D). On other hand, the electronic apparatus 40 receives the power-on signal from the remote controller when the communication module CPU 80 is ON (the period of time t1) because the transmission and reception unit 54 operates (see FIGS. 5C and 5D). When the electronic apparatus 40 receives the power-on signal from the remote controller 10, the operation goes to step S60 and when the electronic apparatus 40 receives no power-on signal from the remote controller 10, the operation remains in the step S50 where it becomes the standby state.

At the step S60, the communication module CPU 80 of the electronic apparatus 40 transmits the ACK code to the transmission and reception unit 54 based on the power-on signal received from the remote controller 10. The transmission and reception unit 54 receives the ACK code, performs the modulation processing on the ACK code, and supplies it to the RF antenna 52. The RF antenna 52 then transmits it to the remote controller 10.

At step S70, the remote controller 10 judges whether or not the ACK code is received. When the ACK code is received, the operation goes to step S80 and when the ACK code is not received, the operation goes to step S75.

At the step S75, the remote controller 10 judges whether or not the period of time t3 that is the period for the transmission of the power-on signal from the remote controller 10 has elapsed (see FIG. 5C). When the period of time t3 has elapsed, the operation goes to step S80 while when the period of time t3 has not elapsed, the operation goes back to the step S40.

At the step S80, the remote controller 10 stops the transmission of the power-on signal when receiving the ACK code even if the period of transmission time of the power-on signal from the remote controller 10 stays within the period of time t3 (broken line in FIG. 5C). Alternatively, the remote controller 10 stops the transmission of the power-on signal when the period of time t3 has already elapsed even if the remote controller 10 receives no ACK code.

On the other hand, at step S90, the communication module CPU 80 of the electronic apparatus 40 obtains the remote control code, which shifts the power supply of the electronic apparatus main body 82 from the standby state thereof to the normal state thereof, from the power-on signal (step S50) received from the remote controller 10. The electronic apparatus main body 82 then shifts (returns) from the standby state thereof to the normal state thereof based on the remote control code received from the communication module CPU 80.

At step S100, the communication module CPU 80 of the electronic apparatus 40 detects the power supply information, which is associated with the shift to the normal state of the electronic apparatus main body 82, received from the electronic apparatus main body 82, and shifts from the intermittent operation mode thereof to the normal operation mode thereof. For example, the power supply signal (voltage) received from the electronic apparatus main body 82 as the power supply information changes from the L-level to the H-level (see FIG. 5E).

According to the embodiments, the communication module CPU 80 drives intermittently at the time of the standby state of the electronic apparatus main body 82, so that it is possible to reduce the average power consumption of the communication module CPU 80 at the time of the standby state in the electronic apparatus 40 in accordance with ON/OFF duty ratio. It is to be noted that even if the trigger such as a timer is used in order to operate the communication module CPU 80 intermittently, the average power consumption can be reduced as compared with a case where the whole communication module CPU 80 is driven.

Also, since the period of transmission time of the power-on signal from the remote controller is set longer than the period of OFF time in the intermittent operation mode of the communication module CPU 80 on the electronic apparatus 40, it is possible for the electronic apparatus 40 to receive the power-on signal from the remote controller surely even if the communication module CPU 80 of the electronic apparatus 40 drives intermittently.

Further, since the remote controller 10 stops the transmission (generation) of the power-on signal when the remote controller 10 receives the ACK code from the electronic apparatus 40 even if it is within the period of time t3, it is possible to omit any wasteful transmission and to reduce the power consumption of the remote controller 10.

It is to be noted that the technical scope of the present invention is not limited by the embodiments mentioned above and includes a scope added with various kinds of modifications to the embodiments mentioned above within a scope not departing from the spirit of the present invention.

Although, in the embodiments mentioned above, the electronic apparatus such as a television, a DVD/video recorder and the like has been described, it is possible to apply the present invention to an electronic apparatus such as an illumination apparatus, air conditioner apparatus and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A remote controller that controls an electronic apparatus using radio wave, the remote controller comprising:

an operation unit that has a changeover key for shifting the electronic apparatus from a standby state thereof to a normal state thereof; and a communication module that transmits to the electronic apparatus a power-on signal for shifting the electronic apparatus to the normal state thereof based on operation to the changeover key, wherein a period of transmission time of the remote controller for transmitting the power-on signal is longer than a period of off time of a communication module of the electronic apparatus in the intermittent operation thereof and is longer than a period of transmission time of the remote controller for transmitting other remote control signals; and wherein the communication module stops transmission of the power-on signal when receiving a response signal from the electronic apparatus in response to the power-on signal transmitted from the remote controller to the electronic apparatus even in the period of the transmission time of the power-on signal.

2. The remote controller according to claim 1 wherein the operation unit has a plurality of operation keys for controlling the electronic apparatus remotely; and wherein function of the changeover key is assigned to at least any one of the plurality of operation keys.

3. A remote control system, comprising:

a remote controller; and an electronic apparatus that is remotely controlled by the remote controller based on a remote control signal transmitted from the remote controller using radio wave, wherein the electronic apparatus includes:

a first communication module that receives the remote control signal transmitted from the remote controller, and an electronic apparatus main body that performs predetermined processing based on the remote control signal from the remote controller, the remote control signal being received by the first communication module;

wherein the remote controller includes:

an operation unit that has a changeover key for shifting the electronic apparatus main body from a standby state thereof to a normal state thereof,; and a second communication module that transmits to the electronic apparatus a power-on signal for shifting the electronic apparatus main body to the normal state thereof based on operation to the changeover key, wherein a period of off time of the first communication module of the electronic apparatus in an intermittent operation thereof is shorter than a period of transmission time of the remote controller for transmitting a power-on signal that causes the electronic apparatus main body to shift the standby state thereof to a normal state thereof, and the period of transmission time of the remote controller for transmitting the power-on signal is longer than a period of transmission time of the remote controller for transmitting other remote control signals, and wherein the first communication module of the electronic apparatus shifts from the intermittent operation mode thereof to the normal operation mode based on the power-on signal received from the remote controller.

4. The remote control system according to claim 3 wherein the first communication module of the electronic apparatus transmits a response signal to the remote controller when receiving the power-on signal from the remote controller; and wherein the second communication module of the remote controller stops transmission of the power-on signal even in the period of the transmission time of the power-on signal when receiving a response signal from the electronic apparatus in response to the power-on signal transmitted from the remote controller to the electronic apparatus.

* * * * *